US012103655B2

(12) United States Patent
Brauer

(10) Patent No.: US 12,103,655 B2
(45) Date of Patent: Oct. 1, 2024

(54) DRIVELINE ARRANGEMENT AND METHOD OF CONTROLLING A DRIVELINE ARRANGEMENT

(71) Applicant: Volvo Penta Corporation, Gothenburg (SE)

(72) Inventor: Samuel Brauer, Gothenburg (SE)

(73) Assignee: Volvo Penta Corporation, Gothenburg (SE)

( * ) Notice: Subject to any disclaimer, the term of this patent is extended or adjusted under 35 U.S.C. 154(b) by 0 days.

(21) Appl. No.: 18/114,354

(22) Filed: Feb. 27, 2023

(65) Prior Publication Data

US 2023/0294811 A1    Sep. 21, 2023

(30) Foreign Application Priority Data

Mar. 15, 2022   (EP) ..................................... 22162151

(51) Int. Cl.
*B63H 23/16*     (2006.01)
*F02D 41/00*    (2006.01)

(52) U.S. Cl.
CPC ........... *B63H 23/16* (2013.01); *F02D 41/009* (2013.01)

(58) Field of Classification Search
CPC ........ F02D 25/04; F02D 31/001; F02D 41/00; F02D 41/009; F02D 41/0097;
(Continued)

(56) References Cited

U.S. PATENT DOCUMENTS 7,792,626 B2 *   9/2010   Eriksson ................. F02D 25/02
                                                    477/6
8,631,885 B2 *   1/2014   Oriet ........................ B60K 5/08
                                                    180/69.6
(Continued)

FOREIGN PATENT DOCUMENTS

DE          516348 C     1/1931
EP          2067966 A1   6/2009
(Continued)

OTHER PUBLICATIONS

Extended European Search Report for European Patent Application No. 22162151.9, mailed Sep. 8, 2022, 15 pages.

*Primary Examiner* — Carl C Staubach
*Assistant Examiner* — Johnny H Hoang
(74) *Attorney, Agent, or Firm* — Withrow & Terranova, PLLC

(57) ABSTRACT

A driveline arrangement, comprising a first internal combustion engine, a second internal combustion engine, and a transmission arrangement comprising a first input shaft drivingly connected to a first crank shaft of the first internal combustion engine, and a second input shaft drivingly connected to the second crank shaft of the second internal combustion engine, the transmission arrangement being configured to simultaneously receive a torque from the first and second crank shafts. Further, control circuitry of a control unit is configured to control the first internal combustion engine to assume a combustion stage at a different point in time compared to the point in time at which the second internal combustion engine assumes its combustion stage by adjusting a crank angle degree of the first crank shaft.

11 Claims, 3 Drawing Sheets

(58) Field of Classification Search
CPC .... F02D 25/02; F02D 25/022; F02D 2250/21; F02D 2250/28; B63H 23/12; B63H 23/14; B63H 23/16; B63H 20/01; B60K 5/08; Y10S 123/08
See application file for complete search history.

(56) References Cited

U.S. PATENT DOCUMENTS

| | | | |
|---|---|---|---|
| 8,641,571 B2* | 2/2014 | Ichikawa | B60K 6/387 |
| | | | 477/6 |
| 8,936,011 B2* | 1/2015 | Bruns | F02B 73/00 |
| | | | 123/434 |
| 2005/0126173 A1* | 6/2005 | Anderson | F02D 25/04 |
| | | | 60/698 |
| 2005/0261109 A1 | 11/2005 | Winkel et al. | |
| 2011/0213533 A1 | 9/2011 | Ueoka et al. | |
| 2018/0121596 A1 | 5/2018 | White | |

FOREIGN PATENT DOCUMENTS

| | | |
|---|---|---|
| GB | 515353 A | 12/1939 |
| JP | S57113935 A | 7/1982 |

* cited by examiner

DRIVELINE ARRANGEMENT AND METHOD OF CONTROLLING A DRIVELINE ARRANGEMENT

RELATED APPLICATIONS

The present application claims priority to European Patent Application No. 22162151.9, filed on Mar. 15, 2022, and entitled "DRIVELINE ARRANGEMENT AND METHOD OF CONTROLLING A DRIVELINE ARRANGEMENT," which is incorporated herein by reference in its entirety.

TECHNICAL FIELD

The present invention relates to a driveline arrangement. The invention also relates to a method of controlling a driveline arrangement. Although the invention will mainly be directed to a driveline arrangement for a marine vessel, the invention may also be applicable for other types of applications, such as for a driveline of a vehicle in the form of e.g. a truck, etc.

BACKGROUND

Internal combustion engines and transmission arrangements are conventionally used in driveline arrangement for various types of vehicles, such as cars, trucks, marine vessels, and motorcycles. The transmission arrangement is, for example, arranged to provide a number of gear ratios between the internal combustion engine and the drive unit, where the drive unit can be formed by e.g. the wheels of a vehicle or a propeller/impeller of a marine vessel. The transmission arrangement may also be configured to merely change between forward driving operation and rearward driving operation, which is conventional for a marine vessel implementation.

However, disturbing noise may be generated in the driveline during operation. In particular, unloaded gears, that is, gear wheel pairs may cause rattle in the transmission arrangement which cause both the unwanted noise as well as to some extent damage to the gears in terms of wear. The rattle is generated by the torsional vibrations generated by the internal combustion engine.

It is therefore a desire to further improve driveline arrangements in terms of reducing noise caused by the torsional vibrations from the internal combustion engine.

SUMMARY

It is thus an object of the present invention to at least partially overcome the above described deficiencies.

According to a first aspect, there is provided a driveline arrangement, comprising a first internal combustion engine comprising a first combustion cylinder housing a first reciprocating piston connected to a first crank shaft, wherein the first internal combustion engine is configured to assume a combustion stage in which a combustible gas is combusted in the first combustion cylinder, a second internal combustion engine comprising a second combustion cylinder housing a second reciprocating piston connected to a second crank shaft, wherein the second internal combustion engine is configured to assume a combustion stage in which a combustible gas is combusted in the second combustion cylinder, a transmission arrangement comprising a first input shaft drivingly connected to the first crank shaft, and a second input shaft drivingly connected to the second crank shaft, the transmission arrangement being configured to simultaneously receive a torque from the first and second crank shafts, wherein the transmission arrangement further comprises an output shaft connectable to a drive unit, and a control unit connected to the first and second internal combustion engines, the control unit comprising control circuitry configured to control the first internal combustion engine to assume its combustion stage at a different point in time compared to the point in time at which the second internal combustion engine assumes its combustion stage by adjusting a crank angle degree of the first crank shaft.

The transmission arrangement of the present invention is thus configured to simultaneously receive torque from the first and the second internal combustion engine, i.e. receive torque from two internal combustion engines at the same time. The driveline arrangement hereby comprises two internal combustion engines for operating the driveline.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The inventor has unexpectedly realised that rattle in free gears, i.e. gears of the transmission arrangement not being used for the transmission of torque, can be exposed to rattle, in particular for a transmission driven by two internal combustion engines. The present invention is based on the insight that the two internal combustion engines can be controlled in an efficient manner to reduce the rattle, and thereby reducing unwanted noise emitted from the driveline arrangement. In particular, the inventor has realised that by shifting the phasing of the internal combustion engines in such a way that the combustion stage of the respective internal combustion engine occurs at different point in time will reduce the torsional vibrations from the internal combustion engines into the transmission arrangement. Accordingly, the present invention enables, by relatively small efforts, to reduce the unwanted noise and wear of unloaded gears in a transmission arrangement operated by two internal combustion engines.

According to an example embodiment, the control circuitry may be further configured to receive a signal from the first and second internal combustion engines, the signal being indicative of a crank angle degree of the first piston and the second piston, respectively, and adjust the crank angle degree of the first crank shaft based on a difference between the crank angle degree of the first piston and the crank angle degree of the second piston. Hence, should the combustion stage for the first internal combustion engine be performed at a different point in time compared to the combustion stage for the second internal combustion engine, the control circuitry is omitted from adjusting the crank angle degree of the first crank shaft. The control circuitry hereby keeps track of the combustion stages of each of the first and second internal combustion engines.

According to an example embodiment, the control circuitry may be configured to control the first internal combustion engine to assume its combustion stage in a range between 5-360 crank angle degrees compared to the combustion stage of the second internal combustion engine. The specific difference in crank angle degree may be dependent on the type of internal combustion engines, as well as the transmission arrangement in question. According to an example, the control circuitry may be configured to control the first internal combustion engine to assume its combustion stage in a range between 20-300 crank angle degrees compared to the combustion stage of the second internal combustion engine. Preferably, the first and second internal combustion engines are four stroke engines, i.e. they both operate with a 720 degrees crank angle rotation during a complete combustion cycle.

According to an example embodiment, the control circuitry may be further configured to acquire data from a database, the data being indicative of a plurality of vibration levels of the transmission arrangement, wherein each of the vibration levels is associated with a respective crank angle degree of the first and second internal combustion engines, compare the plurality of vibration levels with each other, determine a crank angle degree difference between the first and second crank shafts representing a minimum vibration level of the transmission arrangement, and control the first internal combustion engine to adjust the crank angle degree of the first crank shaft to obtain the crank angle degree difference between the first and second crank shafts.

Hereby, the control circuitry can receive test data which is indicative of an optimum difference in crank angle degree between the first and second crank shafts for reducing the noise caused by engine vibrations as much as possible.

According to an example embodiment, the driveline arrangement may further comprise a vibration sensor connected to the control unit, the control circuitry being further configured to receive a signal from the vibration sensor, the signal being indicative of a vibration level of the transmission arrangement, control the first internal combustion engine to adjust the crank angle degree of the first crank shaft to obtain the crank angle degree difference between the first and second crank shafts, receive an updated signal from the vibration sensor, the updated signal being indicative of a vibration level of the transmission arrangement after the crank angle degree has been adjusted, and compare the vibration level of the transmission arrangement after the crank angle degree is adjusted with the vibration level before the crank angle degree is adjusted to verify that the vibration level is reduced after the crank angle degree is adjusted.

The vibration sensor may hereby continuously transmit the signal indicative of the vibration level of the transmission arrangement to the control circuitry. The control circuitry may, based on the received signal, iteratively adjust the crank angle degree of the first crank shaft until reaching a minimum vibration level.

According to an example embodiment, the driveline arrangement may further comprise a first overrunning clutch between the first crank shaft and the first input shaft. According to an example embodiment, the control circuitry may be configured to control the first internal combustion engine to assume its combustion stage at the different point in time by controlling the overrunning clutch to assume a slipping state in which a relative rotation between the first crank shaft and the first input shaft is generated. Hereby, the control circuitry can control the overrunning clutch to slip, whereby the point in time at which the combustion stage is performed for the first internal combustion engine will be adjusted. According to an example embodiment, the control circuitry may be configured to control the first internal combustion engine to adjust the rotational speed of the first crank shaft when the overrunning clutch assumes the slipping state.

The overrunning clutch is preferably also arranged to prevent the transmission arrangement to apply a torque on the first and second internal combustion engines, i.e. prevent that a torque is transmitted in the "wrong direction" from the transmission to the internal combustion engine.

According to an example embodiment, the transmission arrangement may be configured to switch between a forward driving mode and a rearward driving mode. The transmission arrangement is in this example embodiment thus only operable between the forward and rearward driving modes. Hence, when the transmission arrangement assumes the forward driving mode, the gears used during the rearward driving mode are unloaded and potentially exposed to rattle.

According to an example embodiment, the driveline arrangement may be a marine vessel driveline arrangement, and the drive unit is one of an impeller or a propeller. Rattle is preferably avoided for a marine vessel, in particular for a marine outboard motor, as the engine is located outside and can be perceived as disturbing when making too much noise. A marine inboard motor can also generate noise that can be perceived as disturbing, and it is thus preferable to reduce rattle also for this type of driveline arrangement.

According to a second aspect, there is provided a method of controlling a driveline arrangement, the driveline arrangement comprising a first internal combustion engine comprising a first combustion cylinder housing a first reciprocating piston connected to a first crank shaft, wherein the first internal combustion engine is configured to assume a combustion stage in which a combustible gas is combusted in the first combustion cylinder, a second internal combustion engine comprising a second combustion cylinder housing a second reciprocating piston connected to a second crank shaft, wherein the second internal combustion engine is configured to assume a combustion stage in which a combustible gas is combusted in the second combustion cylinder, and a transmission arrangement comprising a first input shaft drivingly connected to the first crank shaft, and a second input shaft drivingly connected to the second crank shaft, the transmission arrangement being configured to simultaneously receive a torque from the first and second crank shafts, wherein the transmission arrangement further comprises an output shaft operatively connected to a drive unit, wherein the method comprises the step of controlling the first internal combustion engine to assume its combustion stage at a different point in time compared to the point in time at which the second internal combustion engine assumes its combustion stage by adjusting a crank angle degree of the first crank shaft.

Effects and features of the second aspect are largely analogous to those described above in relation to the first aspect.

According to a third aspect, there is provided a marine vessel comprising a driveline arrangement according to any one of the embodiments described above in relation to the first aspect.

According to a fourth aspect, there is provided a computer program comprising program code means for performing the step of the above described second aspect when the program is run on a computer.

According to a fifth aspect, there is provided a computer readable medium carrying a computer program comprising program means for performing the step of the above described second aspect when the program means is run on a computer.

Effects and features of the third, fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1A:
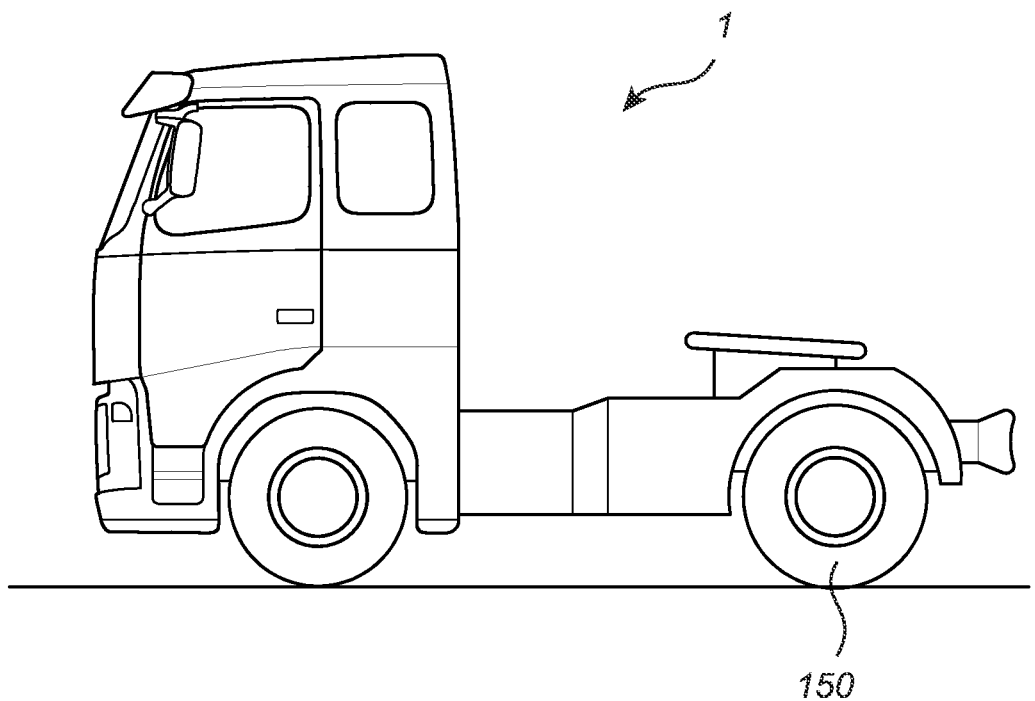
FIG. 1A is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1A, there is provided a vehicle 1 in the form of a truck. The vehicle 1 comprises a drive unit 150 in the form of propelled wheels. Although FIG. 1A indicates that the rear pair of wheels are arranged as propelled wheels, the present disclosure is of course applicable for propelling the front pair of wheels instead, or both the front and rear pair of wheels. The vehicle 1 comprises a driveline arrangement (illustrated in FIG. 2) for transmitting a torque to the drive unit 150. As will be evident from the below disclosure in relation to FIG. 2, the driveline arrangement comprises a pair of internal combustion engines drivingly connected to a transmission arrangement, where the transmission arrangement comprises an output shaft connected to the drive unit.

Figure 1B:
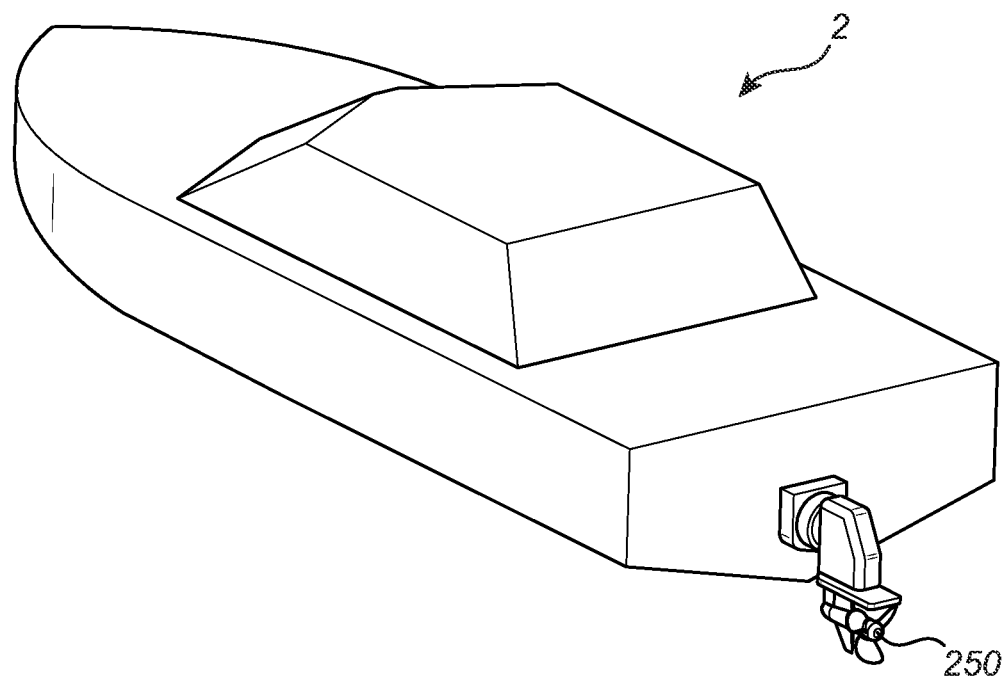
FIG. 1B is a perspective view of a marine vessel according to an example embodiment.

Turning to FIG. 1B, which is a perspective view of a marine vessel 2 which may be particularly suitable for incorporating the below described driveline arrangement. The marine vessel 2 comprises a drive unit 250 in the form of a propeller or impeller.

Figure 2:
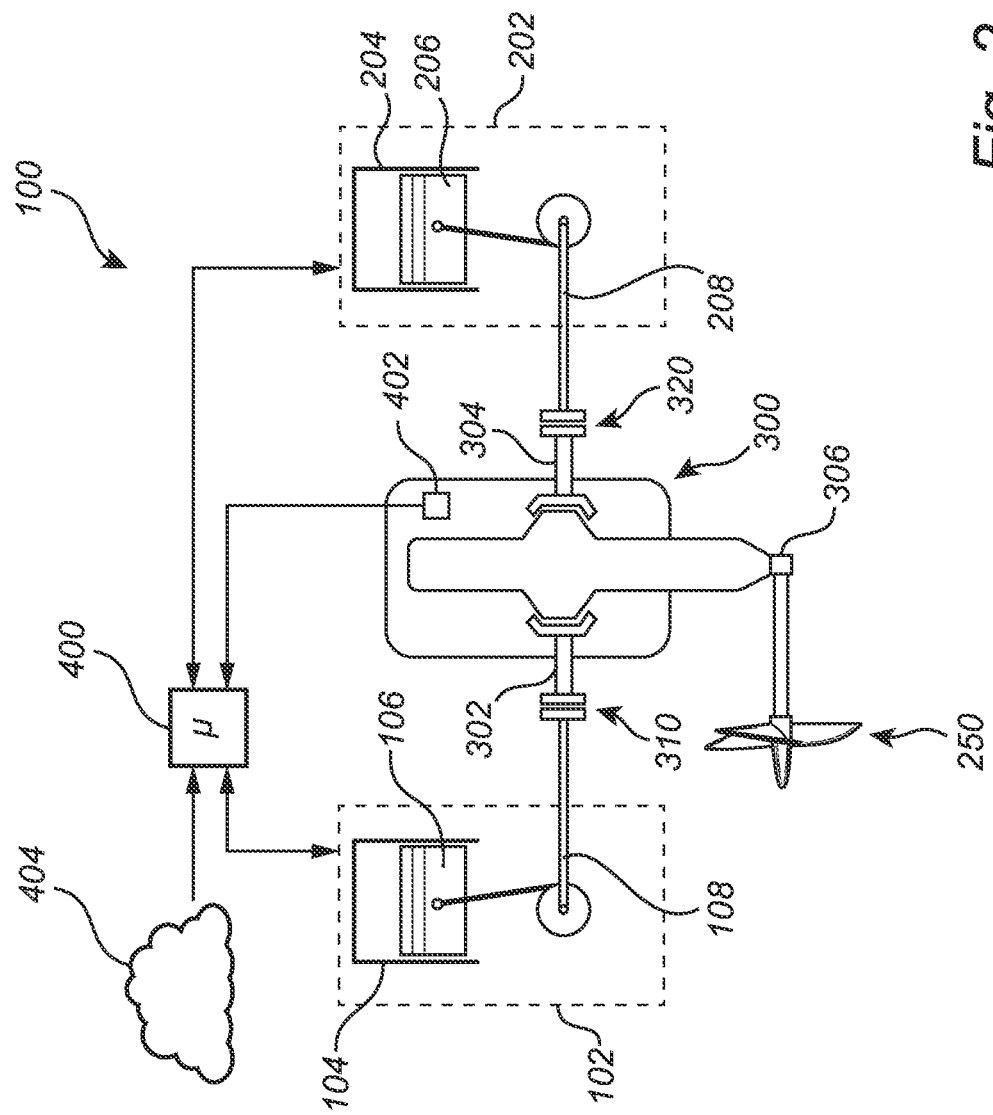
FIG. 2 is a schematic illustration of a driveline arrangement according to an example embodiment.

In order to describe the driveline arrangement 100 in further detail, reference is made to FIG. 2 which is a schematic illustration of the driveline arrangement according to an example embodiment. The embodiment in FIG. 2 is directed to the marine vessel 2 depicted in FIG. 1B but is also applicable for use by the vehicle 1 depicted in FIG. 1A.

As can be seen, the driveline arrangement 100 comprises a first internal combustion engine 102 and a second internal combustion engine 202. The first internal combustion engine 102 comprises a first combustion cylinder 104. The first combustion cylinder 104 houses a first reciprocating piston 106 which is connected to a first crank shaft 108. The first reciprocating piston 106 is thus arranged to reciprocate between a bottom dead centre (BDC) and a top dead centre (TDC) within the first combustion cylinder 104. Furthermore, the first internal combustion engine 102 is configured to assume a combustion stage in which a combustible gas is combusted in the first combustion cylinder 104. In a similar vein, the second internal combustion engine 202 comprises a second combustion cylinder 204. The second combustion cylinder 204 houses a second reciprocating piston 206 which is connected to a second crank shaft 208. The second reciprocating piston 206 is thus arranged to reciprocate between a bottom dead centre (BDC) and a top dead centre (TDC) within the second combustion cylinder 204. Also, the second internal combustion engine 202 is configured to assume a combustion stage in which a combustible gas is combusted in the second combustion cylinder 204.

Furthermore, and as an example embodiment, each of the first 102 and second 202 internal combustion engines may be arranged as a respective hydrogen internal combustion engine (ICE). The combustion in such hydrogen ICE is based on a combustion of air and hydrogen. The hydrogen, or hydrogen fuel, can be combusted in an internal combustion engine over a wide range of fuel-air mixtures. A hydrogen ICE may be operated to produce very low emissions during certain conditions. The hydrogen ICE may operate based on hydrogen liquid or hydrogen gas. As another example, each of the first 102 and second 202 internal combustion engines may be arranged as conventional diesel or petrol ICE, i.e. the combustible gas is provided by one of diesel and petrol. In the latter case, a spark plug (not shown) is used for combusting the petrol, while the compression of diesel fuel ignites combustible gas in the former case.

Moreover, the first 102 and second 202 internal combustion engines may each be operated in a four stroke combustion cycle. Hereby, the combustion stage for each of the first 102 and second 202 internal combustion engines occur once every 720 degree revolution of their respective crank shaft. In other words, the first 108 and second 208 crank shafts rotate 720 degrees between their combustion stages.

As also depicted in FIG. 2, the driveline arrangement 100 further comprises a transmission arrangement 300. The driveline depicted in FIG. 2 is configured to switch between a forward driving mode in which the marine vessel 2 operates in a forward driving direction, and a rearward driving mode in which the marine vessel 2 operates in a rearward driving direction. The transmission arrangement 300 comprises a first input shaft 302 which is drivingly connected to the first crank shaft 108. In further detail, the first input shaft 302 receives a torque from the first crank shaft 108, which torque is generated by the first internal combustion engine 102. The transmission arrangement 300 also comprises a second input shaft 304 which is drivingly connected to the second crank shaft 208. Thus, the transmission arrangement 300 also receives a torque from the second internal combustion engine 202. The torque generated by the second internal combustion engine 202 is transmitted from the second crank shaft 208 to the second input shaft 304. Accordingly, the transmission arrangement 300 is configured to receive a torque from both the first 102 and the second 202 internal combustion engines. In yet further detail, the transmission arrangement receives torque from the first 102 and second 202 internal combustion engines simultaneously and at the same time. The torque fed into the transmission arrangement 300 is transmitted to the drive unit 250 via an output shaft 306 of the transmission arrangement 300. The transmission can comprise gear wheel pairs in different configurations to provide desired gear rations in a known manner.

Moreover, the driveline arrangement 100 also comprises a first overrunning clutch 310. The first overrunning clutch 310 is arranged between the first crank shaft 108 and the first input shaft 302. The first overrunning clutch 310 is configured to prevent a torque from the transmission arrangement 300 in a direction from the first input shaft 302 to the first crank shaft 108. The first overrunning clutch 310 is also configured to assume a slipping state in which a relative rotation is generated between the first crank shaft 108 and the first input shaft 302. Hence, the first input shaft 302 rotates at a lower rotational speed compared to the rotational speed of the first crank shaft 108 when the first overrunning clutch assumes the slipping state.

The driveline arrangement 100 also comprises a second overrunning clutch 320. The second overrunning clutch 320 is arranged between the second crank shaft 208 and the second input shaft 304. The second overrunning clutch 320 is configured to prevent a torque from the transmission arrangement 300 in a direction from the second input shaft 304 to the second crank shaft 208. The second overrunning clutch 320 is also configured to assume a slipping state in which a relative rotation is generated between the second crank shaft 208 and the second input shaft 304. Hence, the second input shaft 304 rotates at a lower rotational speed compared to the rotational speed of the second crank shaft 208 when the second overrunning clutch assumes the slipping state.

Still further, the driveline arrangement 100 comprises a control unit 400 configured to control the operation of the first 102 and second 202 internal combustion engines. In the example embodiment, the driveline arrangement 100 also comprises a vibration sensor 402 arranged on the transmission arrangement 300, as well as a database 404 provided with vibration levels of the transmission arrangement 300 for a variety of mutual crank angle degrees of the first 102 and second 202 internal combustion engines, which will be described in further detail below.

Figure 3:
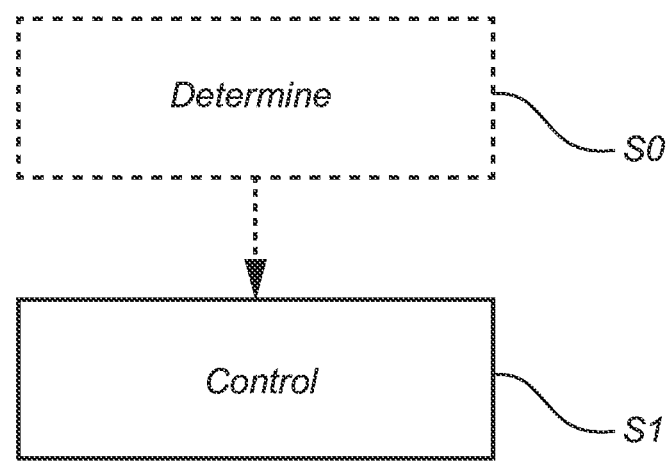
FIG. 3 is a flow chart of a method of controlling a driveline arrangement according to an example embodiment.

During operation of the driveline arrangement 100, the transmission arrangement 300 is exposed to vibrations which may cause undesirable noise. The undesirable noise can be generated by rattle in unloaded gears of the transmission arrangement. The following description, with reference to FIGS. 2 and 3 will now describe the underlying root cause of these increased vibrational levels and how to inventively reduce the vibrational levels to also reduce the noise.

The inventor of the present disclosure has realized that when the combustion stage of the first internal combustion engine 102 occurs at substantially the same point in time as the combustion stage of the second internal combustion engine 202, the vibration levels of the transmission arrangement tend to increase, which in turn generates noise at relatively high levels.

During operation of the driveline arrangement 100, the control unit 400 receives a signal from the first 102 and second 202 internal combustion engines. The signal is indicative of a point in time when the first internal combustion engine 102 assumes its combustion stage and a point in time when the second internal combustion engine 202 assumes its combustion stage, i.e. the control unit 400 hereby determines S0, as an optional initial stage, the relative position of the first 106 and second 206 pistons when the first internal combustion engine assumes its combustion stage. It is thus conceivable that the control unit 400 receives a first signal from the first internal combustion engine 102 and a second signal from the second internal combustion engine 202. In the event the combustion stages for the first 102 and second 202 internal combustion engines occur at substantially the same time, the control unit 400 controls S1 the first internal combustion engine 102 to assume its combustion stage at a different point in time compared to the point in time at which the second internal combustion engine 202 assumes its combustion stage. This is executed by adjusting the crank angle degree of the first crank shaft 108. Preferably, the adjustment of the crank angle degree of the first crank shaft 108 is executed by controlling the first overrunning clutch 310 to assume the slipping state for a predetermined time period. The duration of the predetermined time period is dependent on a desired difference of the points in time when the first and second internal combustion engines assume their respective combustion stage. The slipping state of the first overrunning clutch 310 may also advantageously be combined with an adjustment of the rotational speed of the first crank shaft 108, which rotational speed is controlled by the control unit 400. Such adjustment is preferably executed by reducing the rotational speed of the first crank shaft 108.

As depicted in FIG. 2, the control unit 400 is preferably connected to, or comprises, a database 404. The database 404 may be a cloud based database or implemented in software on a computer or the control unit 400. The database 400 may preferably contain data in the form of a plurality of vibration levels of the transmission arrangement 300. Each vibration level is associated with a respective crank angle degree of the first 102 and second 202 internal combustion engine. More particular, each vibration level is associated with a relative crank angle degree of the first 108 and second 208 crank shafts. The relative crank angle degree thus indicated different point in time when the first 102 and second 202 internal combustion engines assume their respective combustion stage.

The control unit 400 is configured to compare the plurality of vibration levels with each other and determine a crank angle degree difference between the first 108 and second 208 crank shafts that represents a minimum vibration level of the transmission arrangement 300. The control unit 400 hereby control the first internal combustion engine 102 to adjust the crank angle degree of the first crank shaft 108 to obtain the crank angle degree difference that generates the minimum vibration level of the transmission arrangement 300.

As further depicted in FIG. 2, and as briefly indicated above, the exemplified driveline arrangement 300 comprises a vibration sensor 402 arranged on the transmission arrangement 300 and connected to the control unit 400. The vibration sensor 402 thus measures the vibration level of the transmission arrangement 300 during operation.

During operation, the control unit 400 can hereby receive a signal from the vibration sensor 402. The signal indicates a current vibration level of the transmission arrangement 300. The control unit 400 thereafter controls the first internal combustion engine 102 to adjust the crank angle degree of the first crank shaft 108. A crank angle degree difference between the first 108 and second 208 crank shafts is hereby obtained. The control unit 400, again, receives a signal indicative of an updated vibration level after the adjustment of the crank angle degree of the first crank shaft 108. The control unit 400 thereafter compares the vibration level of the transmission arrangement 300 after the crank angle degree is adjusted with the vibration level before the crank angle degree is adjusted. Hereby, the control unit 400 can verify that the vibration level is reduced after the crank angle degree is adjusted. This process can proceed iteratively until a minimum vibration level is determined.

The vibration sensor data and data from the database may be used in conjunction with each other or separate from each other.

Further, the first 102 and second 202 internal combustion engines are, as described above, preferably operated in a four stroke cycle. The control unit thus preferably control the first internal combustion engine 102 to assume its combustion stage in a range between 5-360 crank angle degrees compared to the combustion stage of the second internal combustion engine 202.

It is to be understood that the present disclosure is not limited to the embodiments described above and illustrated in the drawings; rather, the skilled person will recognize that many changes and modifications may be made within the scope of the appended claims.

The invention claimed is:

1. A driveline arrangement, comprising:
a first internal combustion engine comprising a first combustion cylinder housing a first reciprocating piston connected to a first crank shaft, wherein the first internal combustion engine is configured to assume a combustion stage in which a combustible gas is combusted in the first combustion cylinder,
a second internal combustion engine comprising a second combustion cylinder housing a second reciprocating piston connected to a second crank shaft, wherein the second internal combustion engine is configured to assume a combustion stage in which a combustible gas is combusted in the second combustion cylinder,
a transmission arrangement comprising a first input shaft drivingly connected to the first crank shaft, and a second input shaft drivingly connected to the second crank shaft, the transmission arrangement being configured to simultaneously receive a torque from the first and second crank shafts, wherein the transmission arrangement further comprises an output shaft connectable to a drive unit,
a first overrunning clutch between the first crank shaft and the first input shaft, and
a control unit connected to the first and second internal combustion engines, the control unit comprising control circuitry configured to, when the transmission arrangement receives torque simultaneously from the first and second crank shafts:
receive a signal indicative of a point in time when the first internal combustion engine assumes its combustion stage, and a point in time when the second internal combustion engine assumes its combustion stage, and when the combustion stage of the first internal combustion engine occurs at substantially the same time as the combustion stage of the second internal combustion engine:
control the first internal combustion engine to assume its combustion stage at a different point in time compared to the point in time at which the second internal combustion engine assumes its combustion stage by controlling the first overrunning clutch to assume a slipping state in which a relative rotation between the first crank shaft and the first input shaft is generated and to control the first internal combustion engine to adjust the rotational speed of the first crank shaft when the first overrunning clutch assumes the slipping state.

2. The driveline arrangement of claim 1, wherein the control circuitry is further configured to:
receive a signal from the first and second internal combustion engines, the signal being indicative of a crank angle degree of the first piston and the second piston, respectively, and
adjust the crank angle degree of the first crank shaft based on a difference between the crank angle degree of the first piston and the crank angle degree of the second piston.

3. The driveline arrangement of claim 1, wherein the control circuitry is configured to control the first internal combustion engine to assume its combustion stage in a range between 5-360 crank angle degrees Compared to the combustion stage of the second internal combustion engine.

4. The driveline arrangement of claim 1, wherein the control circuitry is further configured to:
acquire data from a database, the data being indicative of a plurality of vibration levels of the transmission arrangement, wherein each of the vibration levels is associated with a respective crank angle degree of the first and second internal combustion engines,
compare the plurality of vibration levels with each other,
determine a crank angle degree difference between the first and second crank shafts representing a minimum vibration level of the transmission arrangement, and
control the first internal combustion engine to adjust the crank angle degree of the first crank shaft to obtain the crank angle degree difference between the first and second crank shafts.

5. The driveline arrangement of claim 1, wherein the driveline arrangement further comprises a vibration sensor connected to the control unit, the control circuitry being further configured to:
receive a signal from the vibration sensor, the signal being indicative of a vibration level of the transmission arrangement,
control the first internal combustion engine to adjust the crank angle degree of the first crank shaft to obtain the crank angle degree difference between the first and second crank shafts,
receive an updated signal from the vibration sensor, the updated signal being indicative of a vibration level of the transmission arrangement after the crank angle degree has been adjusted, and
compare the vibration level of the transmission arrangement after the crank angle degree is adjusted with the vibration level before the crank angle degree is adjusted to verify that the vibration level is reduced after the crank angle degree is adjusted.

6. The driveline arrangement of claim 1, wherein the transmission arrangement is configured to switch between a forward driving mode and a rearward driving mode.

7. The driveline arrangement of claim 1, wherein the driveline arrangement is a marine vessel driveline arrangement, and the drive unit is one of an impeller or a propeller.

8. A method of controlling a driveline arrangement, the driveline arrangement comprising:
a first internal combustion engine comprising a first combustion cylinder housing a first reciprocating piston connected to a first crank shaft, wherein the first internal combustion engine is configured to assume a combustion stage in which a combustible gas is combusted in the first combustion cylinder,
a second internal combustion engine comprising a second combustion cylinder housing a second reciprocating piston connected to a second crank shaft, wherein the second internal combustion engine is configured to assume a combustion stage in which a combustible gas is combusted in the second combustion cylinder,
a transmission arrangement comprising a first input shaft drivingly connected to the first crank shaft, and a second input shaft drivingly connected to the second crank shaft, the transmission arrangement being configured to simultaneously receive a torque from the first and second crank shafts, wherein the transmission arrangement further comprises an output shaft operatively connected to a drive unit, and a first overrunning clutch between the first crank shaft and the first input shaft, wherein the method comprises the step of:

determining a point in time when the first internal combustion engine assumes its combustion stage, and a point in time when the second internal combustion engine assumes its combustion stage, and when the combustion stage of the first internal combustion engine occurs at substantially the same time as the combustion stage of the second internal combustion engine:

controlling the first internal combustion engine to assume its combustion stage at a different point in time compared to the point in time at which the second internal combustion engine assumes its combustion stage by controlling the first overrunning clutch to assume a slipping state in which a relative rotation between the first crank shaft and the first input shaft is generated and to control the first internal combustion engine to adjust the rotational speed of the first crank shaft when the first overrunning clutch assumes the slipping state.

9. A marine vessel comprising a driveline arrangement, the driveline arrangement comprising:

a first internal combustion engine comprising a first combustion cylinder housing a first reciprocating piston connected to a first crank shaft, wherein the first internal combustion engine is configured to assume a combustion stage in which a combustible gas is combusted in the first combustion cylinder, a second internal combustion engine comprising a second combustion cylinder housing a second reciprocating piston connected to a second crank shaft, wherein the second internal combustion engine is configured to assume a combustion stage in which a combustible gas is combusted in the second combustion cylinder, a transmission arrangement comprising a first input shaft drivingly connected to the first crank shaft, and a second input shaft drivingly connected to the second crank shaft, the transmission arrangement being configured to simultaneously receive a torque from the first and second crank shafts, wherein the transmission arrangement further comprises an output shaft connectable to a drive unit, a first overrunning clutch between the first crank shaft and the first input shaft, and a control unit connected to the first and second internal combustion engines, the control unit comprising control circuitry configured to, when the transmission arrangement receives torque simultaneously from the first and second crank shafts:

receive a signal indicative of a point in time when the first internal combustion engine assumes its combustion stage, and a point in time when the second internal combustion engine assumes its combustion stage, and when the combustion stage of the first internal combustion engine occurs at substantially the same time as the combustion stage of the second internal combustion engine:

control the first internal combustion engine to assume its combustion stage at a different point in time compared to the point in time at which the second internal combustion engine assumes its combustion stage by controlling the first overrunning clutch to assume a slipping state in which a relative rotation between the first crank shaft and the first input shaft is generated and to control the first internal combustion engine to adjust the rotational speed of the first crank shaft when the first overrunning clutch assumes the slipping state.

10. A computer program for a driveline arrangement comprising:

a first internal combustion engine comprising a first combustion cylinder housing a first reciprocating piston connected to a first crank shaft, wherein the first internal combustion engine is configured to assume a combustion stage in which a combustible gas is combusted in the first combustion cylinder, a second internal combustion engine comprising a second combustion cylinder housing a second reciprocating piston connected to a second crank shaft, wherein the second internal combustion engine is configured to assume a combustion stage in which a combustible gas is combusted in the second combustion cylinder, a transmission arrangement comprising a first input shaft drivingly connected to the first crank shaft, and a second input shaft drivingly connected to the second crank shaft, the transmission arrangement being configured to simultaneously receive a torque from the first and second crank shafts, wherein the transmission arrangement further comprises an output shaft operatively connected to a drive unit, and a first overrunning clutch between the first crank shaft and the first input shaft, the computer program comprising program code means for transmitting control signals to, when the program is run on a computer, perform the steps of:

determining a point in time when the first internal combustion engine assumes its combustion stage, and a point in time when the second internal combustion engine assumes its combustion stage, and when the combustion stage of the first internal combustion engine occurs at substantially the same time as the combustion stage of the second internal combustion engine:

controlling the first internal combustion engine to assume its combustion stage at a different point in time compared to the point in time at which the second internal combustion engine assumes its combustion stage by controlling the first overrunning clutch to assume a slipping state in which a relative rotation between the first crank shaft and the first input shaft is generated and to control the first internal combustion engine to adjust the rotational speed of the first crank shaft when the first overrunning clutch assumes the slipping state.

11. A computer readable medium for a driveline arrangement comprising:

a first internal combustion engine comprising a first combustion cylinder housing a first reciprocating piston connected to a first crank shaft, wherein the first internal combustion engine is configured to assume a combustion stage in which a combustible gas is combusted in the first combustion cylinder, a second internal combustion engine comprising a second combustion cylinder housing a second reciprocating piston connected to a second crank shaft, wherein the second internal combustion engine is configured to assume a combustion stage in which a combustible gas is combusted in the second combustion cylinder, a transmission arrangement comprising a first input shaft drivingly connected to the first crank shaft, and a second input shaft drivingly connected to the second crank shaft, the transmission arrangement being configured to simultaneously receive a torque from the first and second crank shafts, wherein the transmission arrangement further comprises an output shaft operatively connected to a drive unit, and a first overrunning clutch between the first crank shaft and the first input shaft, the computer program carrying a computer program comprising program means for transmitting control signals to, when the program means is run on a computer, perform the steps of:

determining a point in time when the first internal combustion engine assumes its combustion stage, and a point in time when the second internal combustion engine assumes its combustion stage, and when the combustion stage of the first internal combustion engine occurs at substantially the same time as the combustion stage of the second internal combustion engine:

controlling the first internal combustion engine to assume its combustion stage at a different point in time compared to the point in time at which the second internal combustion engine assumes its combustion stage by controlling the first overrunning clutch to assume a slipping state in which a relative rotation between the first crank shaft and the first input shaft is generated and to control the first internal combustion engine to adjust the rotational speed of the first crank shaft when the first overrunning clutch assumes the slipping state.

* * * * *